(12) United States Patent
Laughlin (10) Patent No.: US 9,604,738 B2
(45) Date of Patent: Mar. 28, 2017

(54) NON-EXPLOSIVE TENSION RELEASE ACTUATOR

(71) Applicant: Patrick John Laughlin, Thousand Oaks, CA (US)

(72) Inventor: Patrick John Laughlin, Thousand Oaks, CA (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 769 days.

(21) Appl. No.: 13/968,168

(22) Filed: Aug. 15, 2013

(65) Prior Publication Data

US 2015/0050078 A1 Feb. 19, 2015

(51) Int. Cl.
*B64G 1/64* (2006.01)
*F16B 21/16* (2006.01)
*B64G 1/22* (2006.01)

(52) U.S. Cl.
CPC ............. *B64G 1/645* (2013.01); *B64G 1/222* (2013.01); *F16B 21/165* (2013.01); *F16B 21/16* (2013.01); *Y10T 403/592* (2015.01); *Y10T 403/593* (2015.01); *Y10T 403/602* (2015.01); *Y10T 403/608* (2015.01)

(58) Field of Classification Search
CPC ......... B64G 1/222; B64G 1/645; F16B 21/09; F16B 21/16; F16B 21/165; Y10T 403/592; Y10T 403/593; Y10T 403/595; Y10T 403/602; Y10T 403/608
USPC ............... 403/322.2, 322.3, 322.4, 327, 330; 294/82.26, 82.28, 82.33
See application file for complete search history.

(56) References Cited

U.S. PATENT DOCUMENTS

| | | | | | |
|---|---|---|---|---|---|
| 3,043,614 | A | * | 7/1962 | Eichmann ................ | B64D 1/06 24/635 |
| 3,430,305 | A | * | 3/1969 | Ted ...................... | B64D 17/383 24/603 |
| 4,257,639 | A | * | 3/1981 | Stock ...................... | B64D 7/08 244/137.4 |
| 4,682,804 | A | | 7/1987 | Palmer et al. | |

(Continued)

FOREIGN PATENT DOCUMENTS

| | | |
|---|---|---|
| EP | 2213572 A1 | 8/2010 |
| JP | 07063245 A | 3/1995 |

OTHER PUBLICATIONS

Search Report and Opinion from Corresponding European Patent Application No. EP14180944, Issued Feb. 12, 2015 (5 sheets).

*Primary Examiner* — Josh Skroupa
(74) *Attorney, Agent, or Firm* — King & Spaulding LLP (57) ABSTRACT

A non-explosive tension release actuation device includes an initiator system and a housing base attached to the initiator system. The device also includes a carriage assembly positioned at least partially within the housing base. The carriage assembly includes a carriage unit, a first jaw, a second jaw, a first rocker arm, and a second rocker arm. The first rocker arm and the second rocker arm are attached to the carriage unit and to the initiator system. The device further includes a load attachment unit positioned at least partially within the carriage unit and between the first jaw and the second jaw. The first jaw and the second jaw are configured to swing away from the load attachment unit in response to a downward motion of the carriage unit relative to the housing base.

20 Claims, 10 Drawing Sheets

(56) References Cited

U.S. PATENT DOCUMENTS

| | | | | |
|---|---|---|---|---|
| 5,312,147 | A | * | 5/1994 | Rudoy .................... B63B 21/60 294/82.3 |
| 6,390,722 | B1 | * | 5/2002 | Godfrey ................ F16B 21/165 294/82.28 |
| 6,467,987 | B1 | | 10/2002 | Larsen et al. |
| 7,125,058 | B2 | * | 10/2006 | Hawthorne ......... E05B 47/0002 294/82.28 |
| 7,963,717 | B2 | * | 6/2011 | Seger .................... F16B 21/165 279/50 |
| 2010/0005913 | A1 | | 1/2010 | Baghdasarian |

\* cited by examiner

NON-EXPLOSIVE TENSION RELEASE ACTUATOR

TECHNICAL FIELD

The present disclosure relates generally to separation devices, in particular to non-explosive tension release actuators for release of an external load.

BACKGROUND

Actuators may be used to actuate release of an external load that is attached to the actuator. For example, an actuator may be used to actuate release of a load such as a satellite at a desired altitude. Pyrotechnic actuators are often used for release of a load in response to an initiation of the release. Generally, pyrotechnic actuators contain an explosive energy source to actuate the release of the load. Impact of the explosion of the energy source that is used to actuate a release may damage the load as well as the pyrotechnic actuator itself. Further, pyrotechnic actuators are generally limited to a single use due to the damage that is cause by the explosion to the actuator components. Storage and transportation of explosive energy sources may also be subject to stringent regulations.

As an alternative to pyrotechnic actuators, non-explosive actuators may be used to enable reusability of the actuator by eliminating use of explosives. To replace the desired actuating effect of the energy source used in pyrotechnic actuators, non-explosive actuators generally rely on preloading the device using a compressed spring. However, a large spring is generally required to support use of a spring-based actuator device with relatively heavy loads. A large spring may require a bigger space within the actuator, which may result in a large actuator or may simply be impractical. Accordingly, a non-explosive actuator that is reusable, resettable, and/or refurbishable and that does not require preloading to achieve actuation may have some advantages.

SUMMARY

In general, the present disclosure relates to non-explosive tension release actuators. In an example embodiment, a non-explosive tension release actuation device includes an initiator system and a housing base attached to the initiator system. The non-explosive tension release actuation device also includes a carriage assembly positioned at least partially within the housing base. The carriage assembly includes a carriage unit, a first jaw, a second jaw, a first rocker arm, and a second rocker arm. The first jaw is positioned on a first side of the carriage unit, and the second jaw positioned on a second side of the carriage unit opposite the first side of the carriage unit. The first rocker arm and the second rocker arm are attached to the carriage unit and to the initiator system. The non-explosive tension release actuation device further includes a load attachment unit positioned at least partially within the carriage unit and between the first jaw and the second jaw. The load attachment unit rests on the first jaw and on the second jaw. The first jaw and the second jaw are configured to swing away from the load attachment unit in response to a downward motion of the carriage unit relative to the housing base. The initiator system is configured to initiate the downward motion of the carriage unit to release the load attachment unit from the carriage assembly.

In another example embodiment, a non-explosive tension release actuation device includes an initiator system comprising a housing cover, a first initiator unit and a second initiator unit. Each of the first initiator unit and the second initiator unit includes an initiator spool assembly, a plunger positioned below the initiator spool assembly. The plunger has a base portion and a protruding portion. The protruding portion extends from the base portion into the initiator spool assembly, and the base portion includes a slanted inner wall on a bottom side of the plunger. Each of the first initiator unit and the second initiator unit also includes a tension shaft positioned below the plunger. The tension shaft includes a groove extending around the tension shaft. Each of the first initiator unit and the second initiator unit further includes ball bearings in contact with the slanted inner wall of the plunger and a bottom surface of the housing cover. The ball bearings are partially positioned in the groove of the tension shaft to prevent the tension shaft from moving downward until the plunger moves upward. The non-explosive tension release actuation device further includes a carriage assembly, the carriage assembly comprising a first rocker arm and a second rocker arm. The first rocker arm is attached to the tension shaft of the first initiator unit, and the second rocker arm is attached to the tension shaft of the second initiator unit. The non-explosive tension release actuation device further includes a load attachment unit positioned at least partially within the carriage assembly. The carriage assembly is configured to release the load attachment unit in response to one or both of the first initiator unit and the second initiator unit initiating a downward motion of the carriage unit to release the load attachment unit from the carriage assembly.

These and other aspects, objects, features, and embodiments will be apparent from the following description and the claims.

BRIEF DESCRIPTION OF THE DRAWINGS

Reference will now be made to the accompanying figures, which are not necessarily to scale, and wherein.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the figures, reference numerals designate like or corresponding, but not necessarily identical, elements.

DETAILED DESCRIPTION OF THE EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Figure 1:
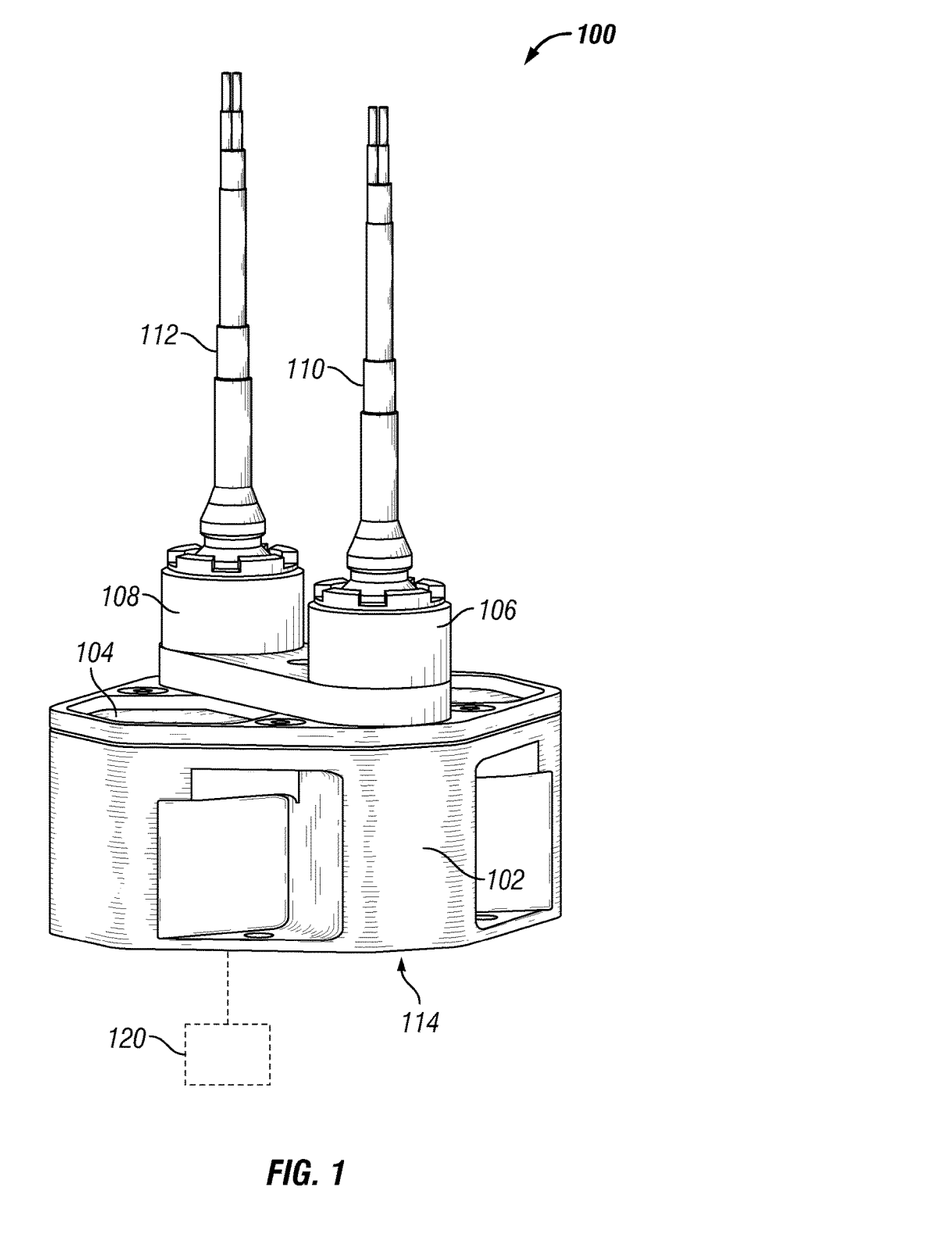
FIG. 1 illustrates a non-explosive tension release actuation device in accordance with an example embodiment.

Turning now to the drawings, example embodiments are described. FIG. 1 illustrates a non-explosive tension release actuation device in accordance with an example embodiment. The non-explosive tension release actuation device (interchangeably referred to as an "actuator" hereinafter) 100 is configured to release an external load coupled to the non-explosive tension release actuation device 100 in response to an initiation by an external control input. For example, the external load may be coupled to a load attachment unit that is held within the actuator 100.

In some example embodiments, the actuator 100 includes a housing base 102 and a housing cover 104 attached to the housing base 102. The housing cover 104 includes a first cylindrical sleeve 106 including components of a first initiator unit. The housing cover 104 also includes a second cylindrical sleeve 108 that contains components of a second initiator unit. A first wire harness 110 is attached to a component of the first initiator unit housed in the first cylindrical sleeve 106. A second wire harness 112 is attached to a component of the second initiator unit housed in the second cylindrical sleeve 108. The two initiator units provide an initiator system that is intentionally redundant to provide, for example, protection against failure of one of the two initiator units.

The housing base 102 includes components that, in response to the initiation by one or more of the initiator units, release any external load (e.g., external load 120) attached to a load attachment unit. The external load may be released from the actuator 100 by releasing the load attachment unit from the non-explosive tension release actuation device 100. For example, the load attachment unit may be released through an opening 114 at a bottom side of the housing base 102.

In some example embodiments, the initiator units may initiate release of the external load in response to an electrical charge received via the first wire harness 110, the second wire harness 112, or both.

In an example embodiment, the height of the actuator 100 measured to a top edge of the cylindrical sleeves 110, 112 is less than 3.5 inches. The housing base 102 and the housing cover 104 may be made from different materials. For example, the housing base 102 and the housing cover 104 may be made from aluminum when the actuator 100 is intended for use with a relatively light load and may be made from steel or a stronger material when intended for use with a relatively heavy load. Further, the actuator 100 is scalable in size to accommodate different applications. In an example embodiment, the actuator 100 supports a maximum external load of 5,000 pounds.

Although the housing base 102 and the housing cover 104 are illustrated as having particular shapes, both the housing base 102 and the housing cover 104 may have other shapes without departing from the scope of this disclosure. For example, the first cylindrical sleeve 106 and the second cylindrical sleeve 108 may have non-cylindrical shapes.

Figure 2:
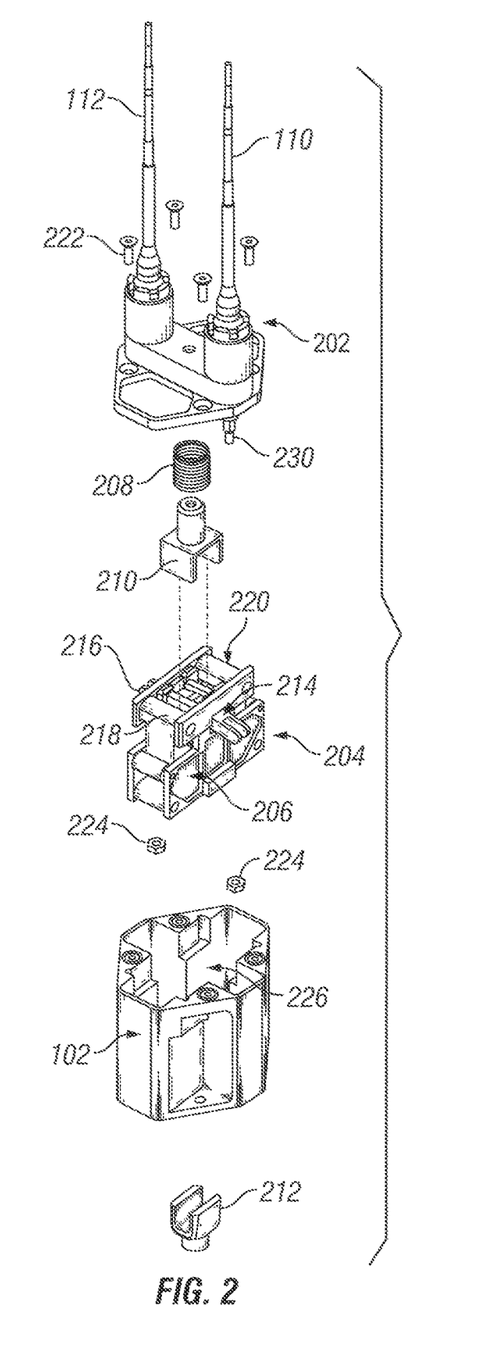
FIG. 2 illustrates an exploded view of the non-explosive tension release actuation device of FIG. 1 in accordance with an example embodiment.

FIG. 2 illustrates an exploded view of the non-explosive tension release actuation device of FIG. 1 in accordance with an example embodiment. As illustrated, the non-explosive tension release actuation device 100 includes an initiator system 202, a carriage assembly 204, the housing base 102, and the load attachment unit 212. The non-explosive tension release actuation device 100 also includes a spring 208 and a spring guide 210. The two dotted lines in FIG. 2 illustrate the placement of the spring guide 210 into the carriage assembly 204. The spring 208 is intended to be inserted in the cylindrical protrusion extending from a plate of the spring guide 210. The spring 208 is intended to reduce undesired movement of the components of the non-explosive tension release actuation device 100. For example, once the carriage assembly 204 is placed within a cavity 226 of the housing base 102, the spring 208 may exert enough force on the carriage assembly 204 to prevent an upward movement of the carriage assembly 204.

In some example embodiments, the initiator system 202 includes a first tension shaft 230 and a second tension shaft (illustrated in FIG. 3) that extend down from the housing cover 104. When fully assembled, the housing cover 104 may be attached to the housing base 102 by one or more fasteners (e.g., screw) 222 that extend through apertures in the housing cover 104 and are coupled to corresponding attachment holes in the housing base 102.

In some example embodiments, the carriage assembly 204 includes a carriage unit 206, a first rocker arm 214 and a second rocker arm 216. The first rocker arm 214 and the second rocker arm 216 are attached to the carriage unit 206 on opposite sides of the carriage unit 206. The first tension shaft 230 may be inserted into a slot or an opening in the first rocker arm 214 and may be secured by one of the nuts 224. The other tension shaft may be similarly secured to the second rocker arm 216 by one of the nuts 224.

The carriage assembly 204 also includes a first jaw 218 and a second jaw 220. As described below, the first jaw 218 and the second jaw 220 swing outwardly to release an external load that may be attached to a load attachment unit 212. When the non-explosive tension release actuation device 100 is fully assembled, the load attachment unit 212 is positioned at least partially within the carriage assembly 204, and in particular, within the carriage unit 206. An external load is held by the non-explosive tension release actuation device 100 by attachment to the load attachment unit 212. The load attachment unit 212 is released out of the carriage assembly 204 to release any external load attached to the load attachment unit 212.

Figure 3:
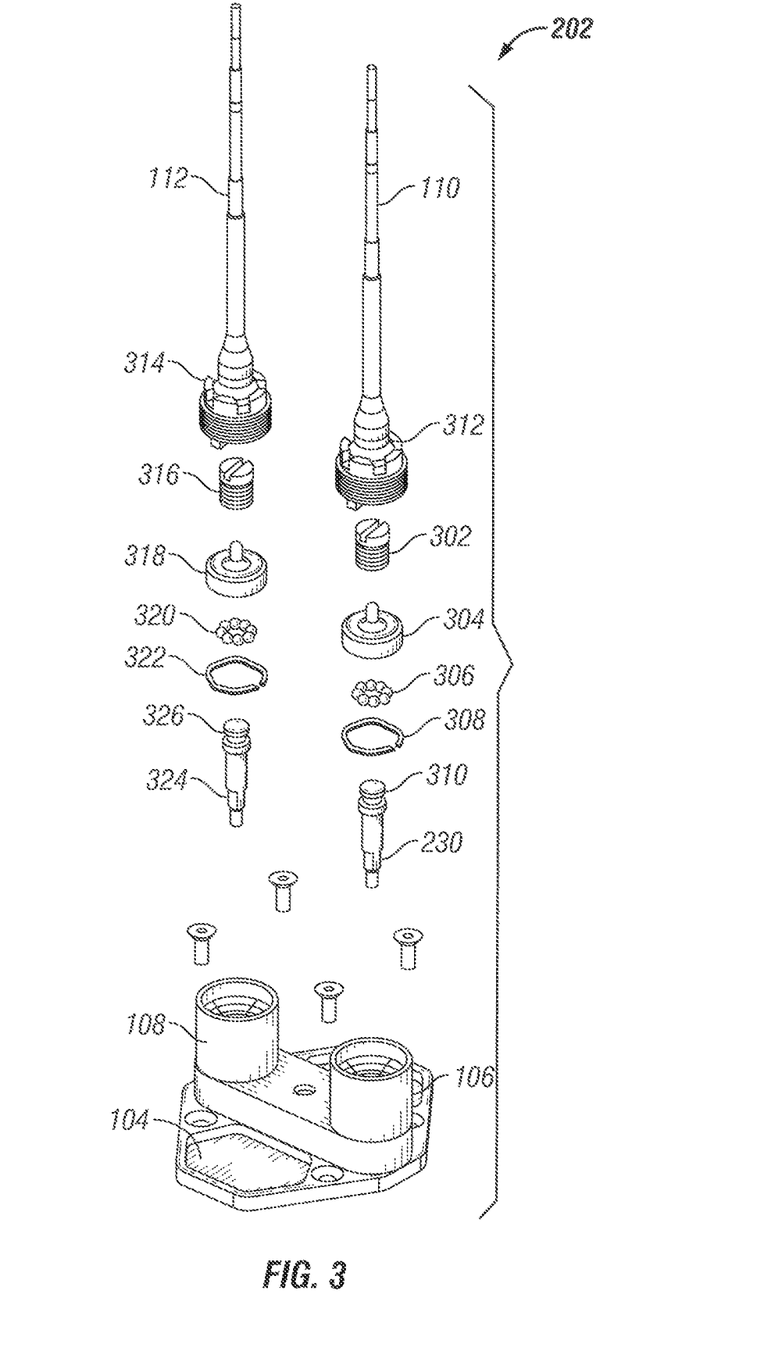
FIG. 3 illustrates an exploded view of the initiator system illustrated in FIG. 2 in accordance with an example embodiment.

FIG. 3 illustrates an exploded view of the initiator system illustrated on FIG. 2 in accordance with an example embodiment. The initiator system 202 includes a first initiator unit and a second initiator unit. The first initiator unit includes the first wire harness 110, a retaining ring 312, an initiator spool assembly 302, a plunger 304, a set of ball bearings 306, and initiator preload spring 308. The first initiator unit further includes a first tension shaft 230. The first tension shaft 230 includes a groove 310 that extends around the first tension shaft 230 proximal to an end of the first tension shaft 230.

In some example embodiments, the initiator spool assembly 302 is the spool assembly described in U.S. Pat. No. 6,747,541 to Holt et al. ("Holt"), the entire content of which is incorporated herein by reference. The initiator spool assembly 302 may be activated by closing a switch to enable an electrical current through the first wire harness 110 to the initiator spool assembly 302. For example, the first wire harness 110 may be electrically connected by a switch to a power source, such as a battery.

Figure 8:
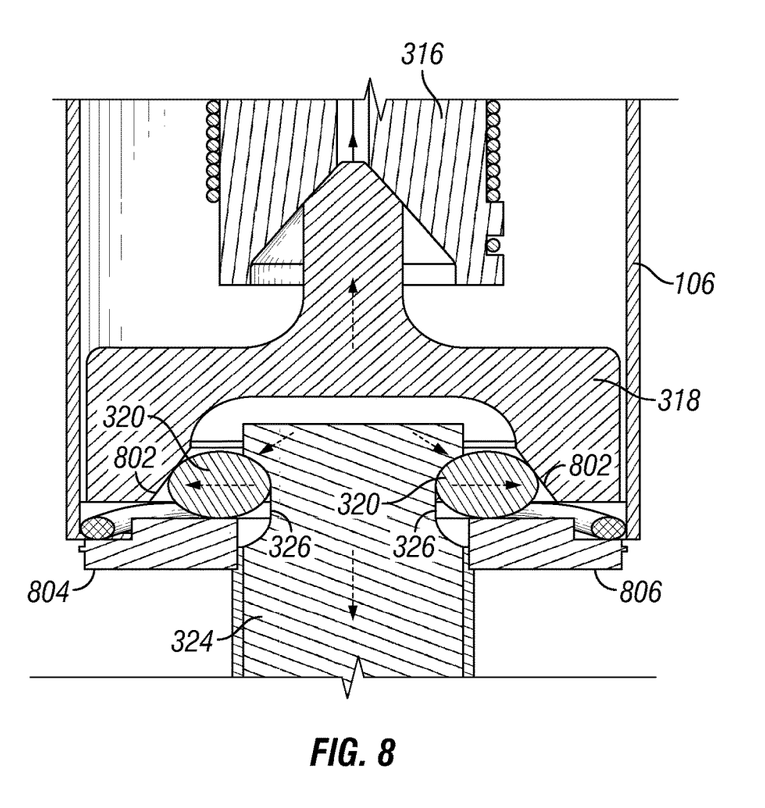
FIG. 8 illustrates a close-up of a partial cross-sectional view of an interface between a tension shaft and the rest of an initiator unit of the initiator system in accordance with an example embodiment.
Figure 9A:
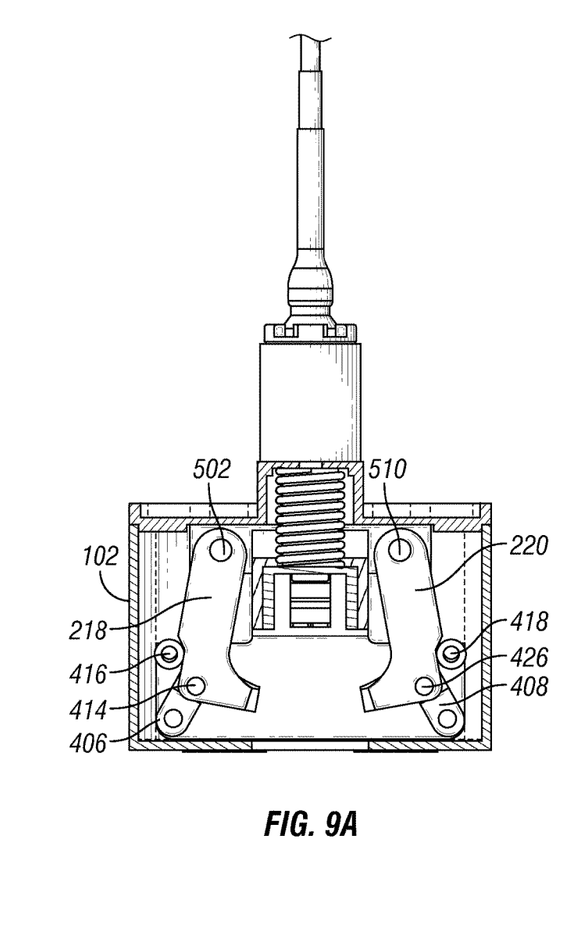
FIGS. 9A and 9B illustrate partial cross-sectional views of the non-explosive tension release actuation device of FIG. 1 after release of an external load including the load attachment unit in accordance with an example embodiment.
Figure 9B:
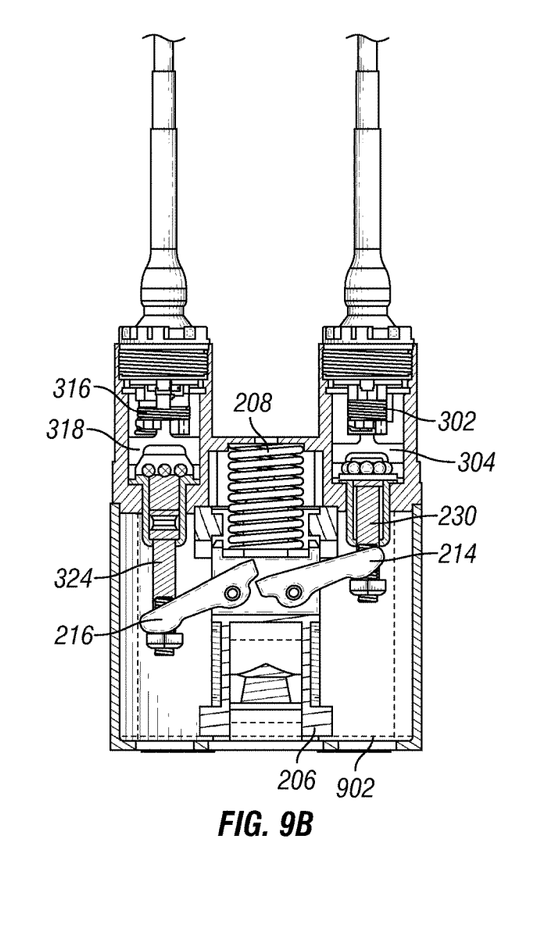

The plunger 304 includes a substantially round base portion and a protrusion portion that is intended to be at least partially positioned within the initiator spool assembly 302 when the first initiator unit is assembled. The initiator spool assembly 302 is designed to hold the protrusion portion and prevent an upward movement of the plunger until the initiator spool assembly 302 is activated by an electrical current. The plunger 304 is intended move upward further into the initiator spool assembly 302 in response to the initiator spool assembly 302 being activated. The set of ball bearings 306 are intended to be positioned below the plunger 304. The placement of the set of ball bearings 306 prior to activation of the initiator spool assembly 302 is illustrated in FIG. 8. The set of ball bearings 306 are intended to exert force on the inner wall of the plunger 304 as shown in FIG. 9. As illustrated in FIG. 9, the inner wall of the plunger 304 is slanted outwardly from the top of the base portion to the bottom of the base portion.

In some example embodiments, the initiator preload spring 308 is intended to be placed between outer edge of the plunger 304 and a surface below the initiator preload spring 308. For example, the surface below the initiator preload spring 308 may be a surface of the housing cover 10 within or under the cylindrical sleeve 108. The initiator preload spring 308 is intended to apply pressure on the plunger toward the initiator spool assembly 302 to facilitate the upward movement of the plunger 304 when the initiator spool assembly 302 is activated.

In some example embodiments, the second initiator unit includes the second wire harness 112, a retaining ring 314, an initiator spool assembly 316, a plunger 318, a set of ball bearings 320, and initiator preload spring 322. The second initiator unit further includes a second tension shaft 324. The second tension shaft 324 includes a groove 326 that extends around the second tension shaft 324 proximal to an end of the second tension shaft 324. In some example embodiments, the components of the second initiator unit operate in the same manner as described with respect to the first initiator unit and will not be repeated here.

However, in some alternative embodiments, the initiator spool assembly 316 may operate in the same or similar manner as the initiator spool assembly 302. For example, the initiator spool assembly 316 may be a spool assembly described in the Holt patent and the initiator spool assembly 302 may be different initiator assembly.

Figure 4:
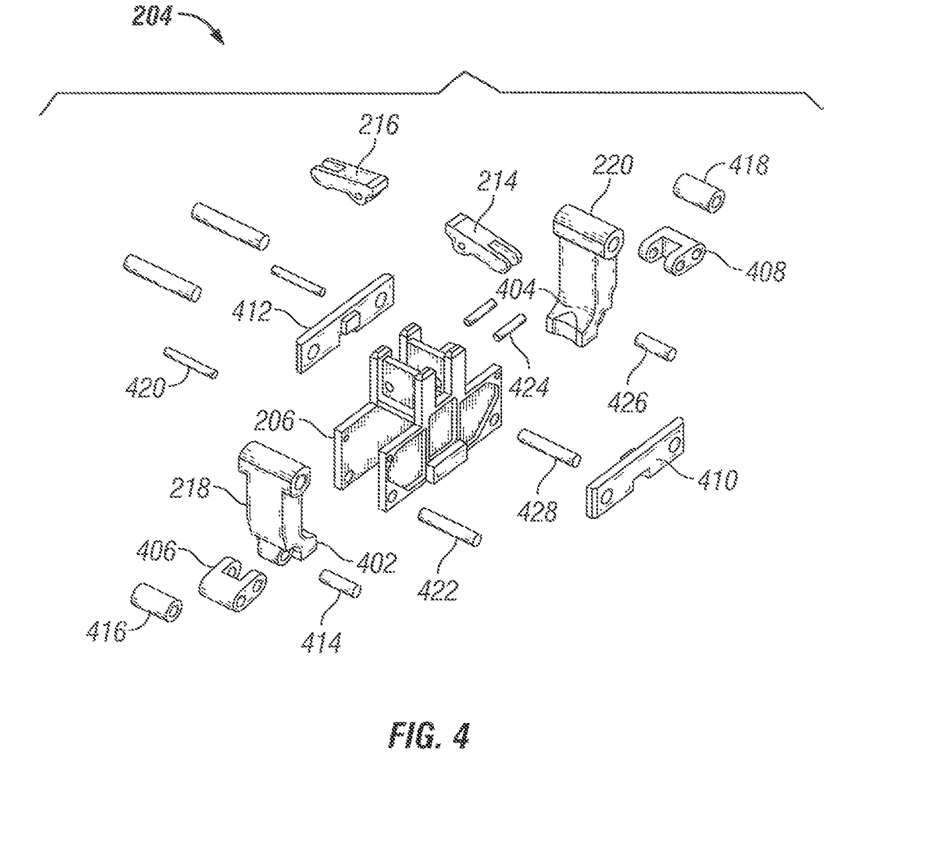
FIG. 4 illustrates an exploded view of the carriage assembly illustrated in FIG. 2 in accordance with an example embodiment.

FIG. 4 illustrates an exploded view of the carriage assembly illustrated on FIG. 2 in accordance with an example embodiment. As illustrated in FIG. 4, the carriage assembly 204 includes the first jaw 218 and the second jaw 220. The first jaw 218 includes a foot portion 402, and the second jaw 220 includes a foot portion 404. A first hinge arm 406 may be attached to the first jaw 218 by a connector 414 such that the first hinge arm 406 and the first jaw 218 may pivot about the connector 414. The connector 414 functions as a pivot point for the first hinge arm 406 and the first jaw 218. Similarly, a second hinge arm 408 may be attached to the second jaw 220 by a connector 426 such that the second hinge arm 408 and the second jaw 220 pivot about the connector 426. The connector 426 functions as a pivot point for the second hinge arm 408 and the second jaw 220.

After the first hinge arm 406 is attached to the first jaw 218 as described above, the first hinge arm 406 and the first jaw 218 may be positioned between two parallel walls of the carriage unit 206 at a first side of the carriage unit 206, where the first hinge arm 406 is attached to the carriage unit 206 by connector 422. Once assembled, the connector 422 functions as a pivot point for the first hinge arm 406.

Similarly, after the second hinge arm 408 is attached to the second jaw 220 as described above, the second hinge arm 408 and the second jaw 220 may be positioned between two parallel walls of the carriage unit 206 at a second side of the carriage unit 206, where the second hinge arm 408 is attached to the carriage unit 206 by connector 428. Once assembled, the connector 428 functions as a pivot point for the second hinge arm 408.

After the first jaw 218 is attached to the carriage unit 206, the first bumper tube 416 is attached to the carriage unit 206 by a connector 420. Similarly, after the second jaw 220 is attached to the carriage unit 206, the second bumper tube 418 is attached to the carriage unit 206 by a connector 430. As explained below with respect to FIG. 9, the first bumper tube 416 and the second bumper tube 418 are positioned on the carriage to minimize and/or to prevent the carriage unit 206 from impacting a lower side of the housing base 102 by stopping the outward swing of the first jaw 218 and the second jaw 220, respectively. In some example embodiments, the first bumper tube 416 and the second bumper tube 418 are made from rubber. Alternatively, the first bumper tube 416 and the second bumper tube 418 may be made from another non-metal and preferably soft material that can absorb impact force from the respective jaw and minimize and/or prevent the jaws from impacting a metal component of the non-explosive tension release actuation device 100.

The first rocker arm 214 may be attached to the carriage unit 206 by a connector 424 that extends through the first rocker arm 214 and two vertical walls of the carriage unit 206. Once assembled, the first rocker arm 214 can pivot about the connector 424. The second rocker arm 216 is also attached to the carriage unit 206 in a similar manner as the first rocker arm 214, and can pivot about its corresponding connector. Attachment of a first load plate 410 and a second load plate 412 to the carriage assembly 204 is described with respect to FIG. 5.

In some example embodiments, all the connectors illustrated in FIG. 4 and used to attach components to the carriage unit 206 are dowel pins. Alternatively, other connectors may be used in place of some or all of the dowel pins. Further, all components illustrated in FIG. 4 may be made from a material, such as aluminum, steel, titanium, or anther corrosion resistant material. For example, all the components in FIG. 4 may be made from heat treated steel.

Figure 5:
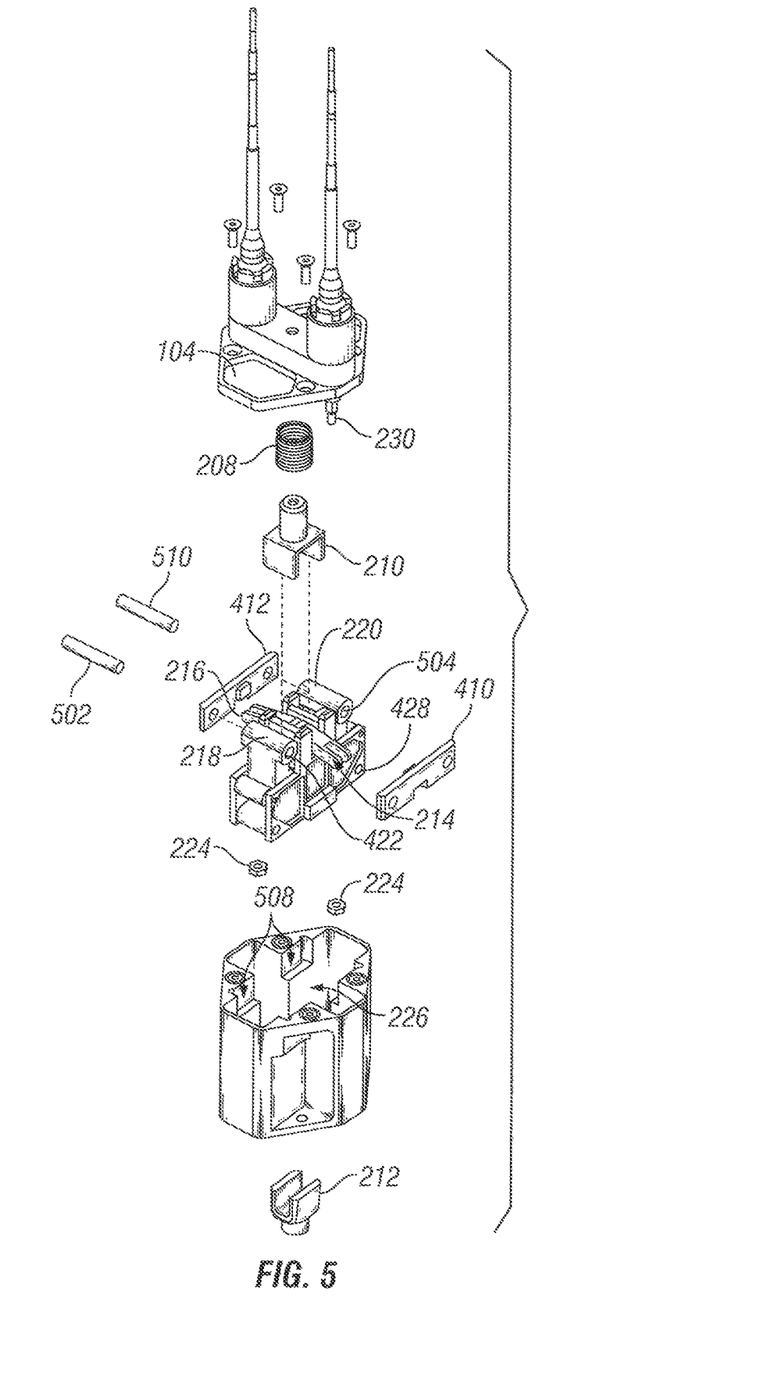
FIG. 5 illustrates another exploded view of the non-explosive tension release actuation device of FIG. 1 in accordance with an example embodiment.

FIG. 5 illustrates another exploded view of the non-explosive tension release actuation device of FIG. 1 in accordance with an example embodiment. FIG. 5 illustrates the carriage assembly 204 close to being fully assembled. In some example embodiments, the first jaw 218 may be attached to the first load plate 410 and to the second load plate 412 by a connector 502. The connector 506 may extend through corresponding apertures in the first load plate 410 and the second load plate 412, and through the aperture 506 in the first jaw 218. Similarly, the second jaw 220 may be attached to first load plate 410 and to the second load plate 412 by a connector 510. The connector 510 may extend through corresponding apertures in the first load plate 410 and the second load plate 412, and through the aperture 504 in the first jaw 218. The connector 502 functions as a pivot point for the first jaw 218, and the connector 510 functions as a pivot point for the second jaw 220.

Figure 7A:
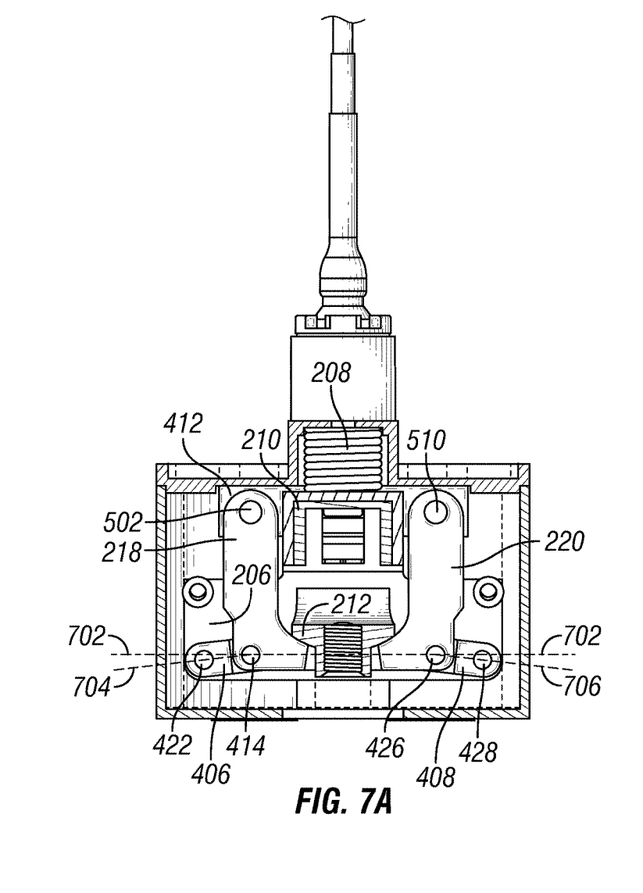
FIGS. 7A-7D illustrate partial cross-sectional views of the non-explosive tension release actuation device of FIG. 1 including directions of exerted forces prior to release of an external load attached to the load attachment unit in accordance with an example embodiment.

After the first load plate 410 and the second load plate 412 are attached to the first jaw 218 and to the second jaw 220, the first rocker arm 214 is attached to the first tension shaft 230 via one of the nuts 224, and the second rocker arm 216 is attached to the second tension shaft 324 (the second tension shaft 324 is shown in FIG. 3) by another one of the nuts 224. In some alternative embodiments, the first rocker arm 214 and the second rocker arm 216 may be attached to the first tension shaft 230 and the second tension shaft 324, respectively, using an attachment means other than a nut. The spring 208 and the spring guide 210 are positioned between the carriage assembly 204 and the housing cover 104. The side walls of the spring guide 210 are positioned in the carriage assembly 204 as illustrated by the dotted lines. The load attachment unit 212 is placed in the carriage assembly 204 such that the load attachment unit 212 rests on the first jaw 218 and the second jaw 220 as illustrated in FIG. 7A. For example, the load attachment unit 212 may be placed in the carriage assembly 204 by swinging the first jaw 218 and the second jaw 220 outwardly about the connector 502 and the connector 510, respectively.

After the first rocker arm 214 and the second rocker arm 216 are attached to their corresponding tension shafts, the carriage assembly 204 may be placed in the cavity 226 of the housing base 102. Upon the carriage assembly 204 being positioned in the cavity 226 of the housing base 102, the second load plate 412 rests on one or more ledges 508 of the housing base 102, and the first load plate 410 similarly rests on corresponding one of more ledges opposite the one or more ledges 508. In some alternative embodiments, the first jaw 218 and the second jaw 220 may be attached directly to the housing base 102 without the use of the load plates 410, 412. For example, the housing base 102 may include attachment holes for attaching the first jaw 218 and the second jaw 220 to the housing base 102. Alternatively, other means may be used to attach the first jaw 218 and the second jaw 220 to the housing base 102.

Figure 6:
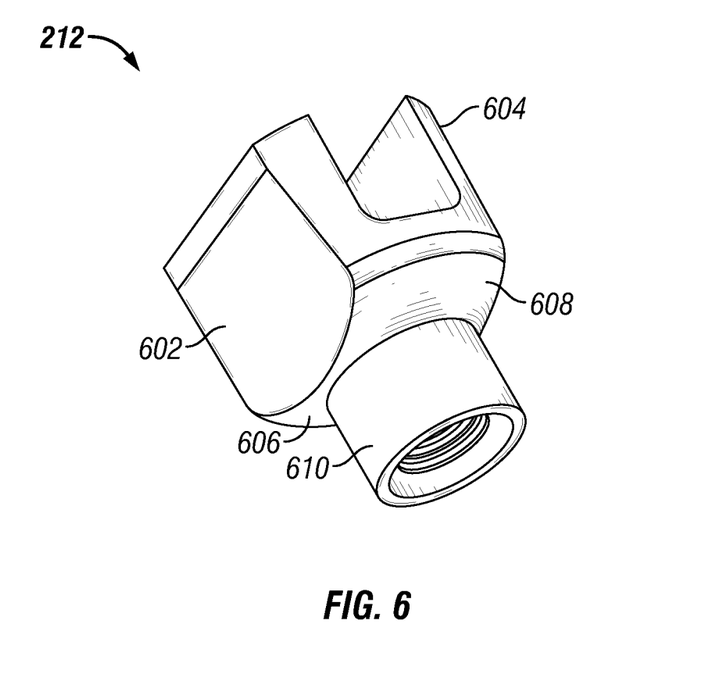
FIG. 6 illustrates the load attachment unit illustrated in FIG. 2 in accordance with an example embodiment.

FIG. 6 illustrates the load attachment unit illustrated on FIG. 2 in accordance with an example embodiment. In an example embodiment, the load attachment unit 212 includes a first wall 602 and a second wall 604. The load attachment unit 212 further includes a first curved surface 606 and a second curved surface 608. Each of the first curved surface 606 and the second curved surface 608 is intended to be in contact with a respective foot of one of the first jaw 218 and the second jaw 220.

In some example embodiments, the load attachment unit 212 further includes an attachment segment 610 having a threaded inner surface for attachment of an external load, such as the external load 120 of FIG. 1, to the load attachment unit. To enable attachment of the external load to the load attachment unit 212 by turning, for example, a threaded screw into the attachment segment 610, the first wall 602 and the second wall 604 prevent a complete rotation of the load attachment unit 212 within the carriage unit 206. In an example embodiment, the load attachment unit 212 is limited to approximately five degrees rotation within the carriage unit 206. One or both of the first wall 602 and the second wall 604 may come in contact with a wall of the carriage unit 206 after the load attachment unit 212 is slightly rotated.

To release an external load attached to the load attachment unit 212, the non-explosive tension release actuation device 100 releases the load attachment unit 212 from the carriage unit 206. After release of the load attachment unit 212, a replacement of the load attachment unit 212 may be required to reuse the non-explosive tension release actuation device 100 unless the load attachment unit 212 can be recovered.

Figure 7B:
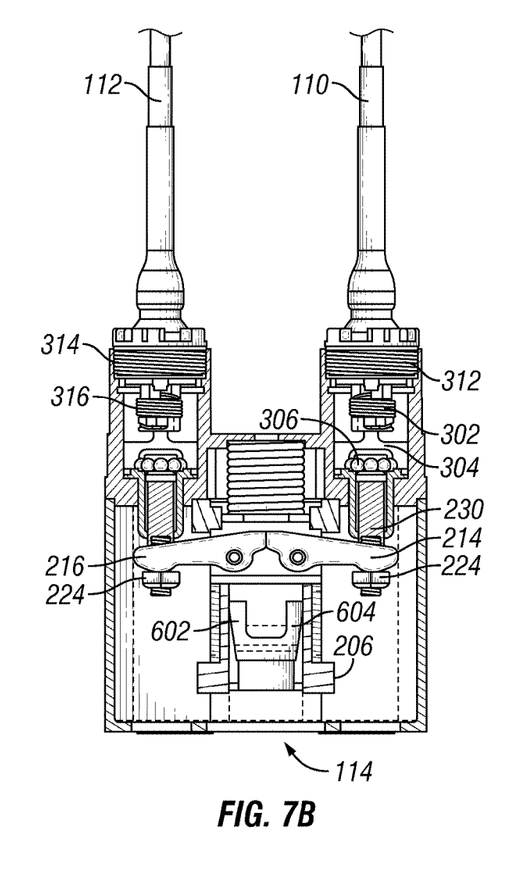
Figure 7C:
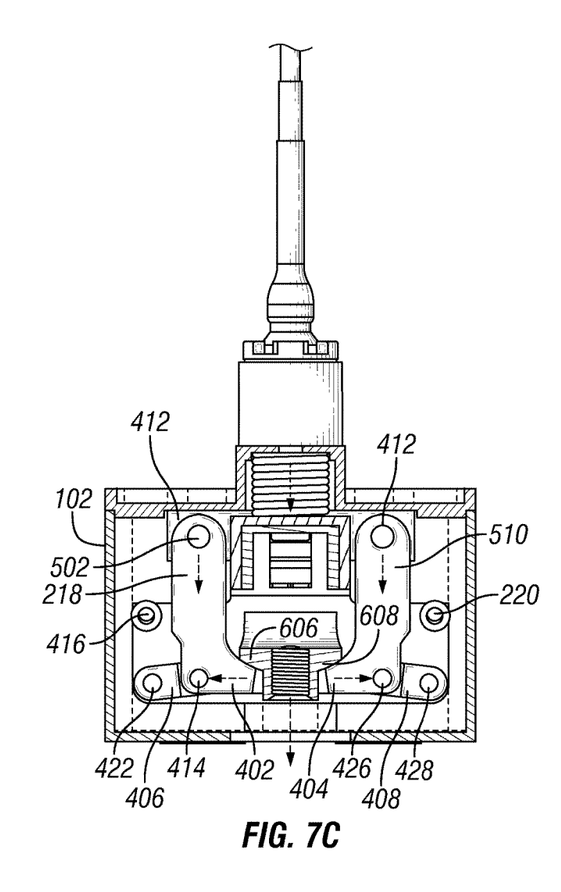
Figure 7D:
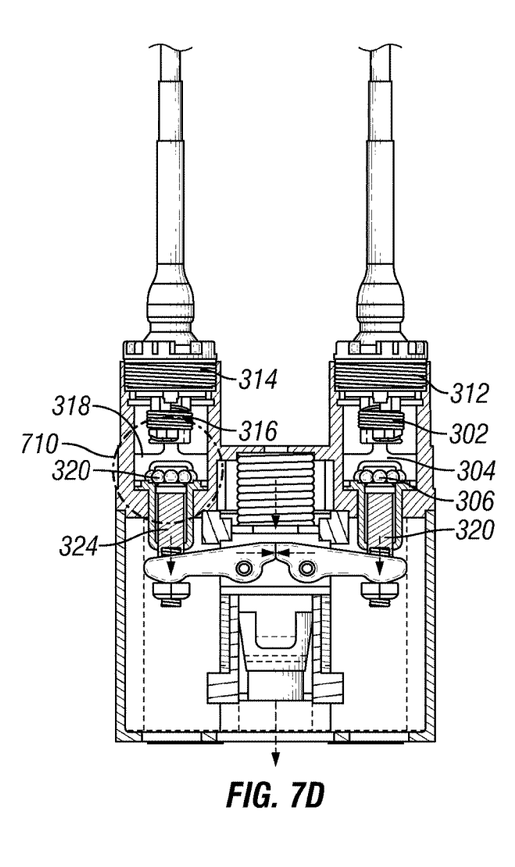

FIGS. 7A-7D illustrate cross-sectional views of the non-explosive tension release actuation device of FIG. 1 in accordance with an example embodiment. FIGS. 7A-7D illustrate the non-explosive tension release actuation device 100 in an armed state and ready to actuate. FIGS. 7C and 7D also illustrate directions of exerted forces (using dashed arrows) while the non-explosive tension release actuation device 100 is in an armed state and prior to release of an external load attached to the load attachment unit in accordance with an example embodiment. The first jaw 218 and the second jaw 220 can be more clearly seen in FIGS. 7A and 7C while the first rocker arm 214 and the second rocker arm 216 are more clearly illustrated in FIGS. 7B and 7D.

As illustrated in FIGS. 7A-7B, the spring 208 rests on the spring guide 210. The spring 208 is compressed and operates to limit upward motion of the carriage assembly 204 while the non-explosive tension release actuation device 100 is in the armed state and also after the release of the load attachment unit 212 along with the external load attached to it.

As illustrated in FIGS. 7A and 7C, the load attachment unit 212 rests on the foot portion 402 of the first jaw 218 and on the foot portion 404 of the second jaw 220. In particular, the first curved surface 606 of the load attachment unit 212 rests on the foot portion 402 of the first jaw 218. Similarly, the second curved surface 608 of the load attachment unit 212 rests on the foot portion 404 of the second first jaw 218. As illustrated in FIG. 7C, the downward force exerted by an external load attached to the load attachment unit 212 is transferred as a horizontal forces and vertical forces on the first jaw 218 and on the second jaw 220.

In some example embodiments, the first hinge arm 406 is angled relative to a horizontal line 702 as the first hinge arm 406 extends from the connector 414 toward the connector 422. As described above, the connector 422 attaches the first hinge arm 406 to the carriage unit 206. Similarly, the second hinge arm 408 is angled relative to the horizontal line 702 as the second hinge arm 408 extends from the connector 426 toward the connector 438. The connector 438 attaches the second hinge arm 408 to the carriage unit 206 as described above. To illustrate, the angle between the horizontal line 702 and a line 704 extending through the centers of the connector 414 and 422 may range from approximately 0 degree to 45 degrees. Similarly, the angle between the horizontal line 702 and a line 706 extending through the centers of the connector 426 and 428 may range from approximately 0 degree to 45 degrees. In some example embodiments, the angle of the first hinge arm 406 and the second hinge arm 408 relative to the horizontal line 702 are approximately equal.

Because of the first hinge arm 406 is angled as illustrated in FIGS. 7A and 7C, and because the first hinge arm 406 is attached to the carriage unit 206 by the connector 422, a portion of the force exerted by the external load on the first jaw 218 (via the load attachment unit 212) is transferred to a downward force on the carriage unit 206. Similarly, because of the second hinge arm 408 is angled as illustrated and because the second hinge arm 408 is attached to the carriage unit 206 by the connector 428, a portion of the downward force exerted by the external load on the second jaw 220 is similarly transferred to a downward force on the carriage unit 206. The direction of the force exerted by the external load is illustrated by the dashed arrow pointing down from the load attachment unit 212.

As illustrated in FIGS. 7B and 7D, the first rocker arm 214 and the second rocker arm 216 are attached to the carriage unit 206. Because the first rocker arm 214 and the second rocker arm 216 are attached to the first tension shaft 230 and to the second tension shaft 324, the first tension shaft 230 and the second tension shaft 324 prevent a downward motion of the carriage unit 206 until one or both of the initiator spool assembly 302, 316 is activated. FIG. 8 illustrates a close-up view of the interface between the first tension shaft 230 and the rest of the first initiator unit shown in the dotted line circle 710. The activation of one or both of the initiator spool assembly 302, 316 enables one or both of the first tension shaft 230 and the second tension shaft 324 to move downward. In turn, the downward motion of one or both of the first tension shaft 230 and the second tension shaft 324 allows the carriage unit 206 to move downward relative to the housing base 102 in response to the downward force on the carriage unit 206.

Thus, a portion of the downward force exerted by the external load on the first jaw 218 and the second jaw 220 is transferred to a downward force on the carriage unit 206, forcing the carriage unit 206 to move downward relative to the housing base 102. Because the first jaw 218 and the second jaw 220 are attached to the first load plate 410 and to the second load plate 412, which rest on ledges (e.g., the ledges 508 shown in FIG. 5) in the housing base 102, the first jaw 218 and the second jaw 220 do not move downward along with the carriage unit 206. However, because the first jaw 218 and the second jaw 220 remain vertically fixed by the connector 502 and the connector 510, respectively, relative to the housing base 102, the downward motion of the carriage unit 206 may result in the first jaw 218 and the second jaw 220 swinging outwardly about the connector 502 and connector 510, respectively, into the positions illustrated in FIG. 9A. The load attachment unit 212 may be released from the carriage unit 206 when the first jaw 218 and the second jaw 220 swing outwardly enough to allow the load attachment unit 212 to exit therebetween.

FIG. 8 illustrates a close-up view of an interface between a tension shaft and the rest of the initiator unit of the initiator system in accordance with an example embodiment. FIG. 8 illustrates the initiator spool assembly 316 and the plunger 318. The plunger 318 has a base portion and a protruding portion. The protruding portion extends from the base portion into the initiator spool assembly 316. The base portion has a slanted inner wall 802 on a bottom side of the plunger 318. The plunger 318 is positioned over the ball bearings 320 and the first tension shaft 230. The ball bearings are in contact with the slanted inner wall of the plunger 318. The ball bearings 320 are also partially positioned in the groove 326 of the first tension shaft 326 to prevent the tension shaft from moving downward until the plunger 318 moves upward providing room for the ball bearings 320 to move horizontally. Prior to the initiator spool assembly 316 being activated, the plunger 318 is prevented from moving upward by the initiator spool assembly 316. As described above, the initiator spool assembly 316 may be activated, for example, by an electrical current that is provided to it via the first wire harness 310. The ball bearings 320 may also rest on a structure 804, 806 that may be a portion of the housing cover 106 or another structure, such as a tension shaft sleeve, that prevents a downward movement of the ball bearings 320.

As illustrated with the dotted arrows in FIG. 8, the downward force exerted on the first tension shaft 230, for example, by the first rocker arm 214 attached to the carriage unit 206 may result in the first tension shaft 230 exerting a force on the ball bearings 320. The ball bearings in turn exert a force on the slanted inner wall 802 of the plunger 318. The force exerted on the slanted inner wall 802 by the ball bearings 320 is transferred into a vertical force directed toward the initiator spool assembly 316. However, as described above, the initiator spool assembly 316 prevents a vertical movement of the plunger 318 until the initiator spool assembly 316 is activated. When the initiator spool assembly 316 is activated, the plunger 318 moves upward further into the initiator spool assembly 316, which allows the ball bearings to move horizontally and away from the groove 326 of the first tension shaft 230. When the ball bearings 320 move away from the groove 326, the first tension shaft 230 is free to move downward in response to the downward force exerted on it by the carriage unit 206 via the first rocker arm 214. The release of the first tension shaft 230 allows the carriage unit 206 to move downward relative to the housing base 102 because of the downward force exerted on it, as described with respect to FIGS. 7A-7D.

The above description with respect to the operation and interface between the first tension shaft 230 and the rest of first initiator unit of the initiator system is equally applicable to operation and interface between the second tension shaft 324 and the rest of second initiator unit of the initiator system.

FIGS. 9A and 9B illustrate cross-sectional views of the non-explosive tension release actuation device of FIG. 1 after release of the load attachment unit including the external load attached to it in accordance with an example embodiment. FIG. 9B illustrates the position of the first rocker arm 214 and the second rocker arm 216 after only the initiator spool assembly 316 was activated. As illustrated in FIG. 9B, the second tension shaft 324 has moved down from its initial position illustrated in FIGS. 7A-7D while the first tension shaft 230 remains substantially in its initial position. After the initiator spool assembly 316 is activated, the plunger 318 has moved up further into the initiator spool assembly 316 and the ball bearings 320 have moved outwardly from their position illustrated in FIGS. 7B and 7D, which enabled the second tension shaft 324 to move downward. The upward motion of the plunger 318 has allowed the ball bearings 320 to move out of the groove 326 of the second tension shaft 324, allowing the second tension shaft 324 to move downward. Further, the spring 208 is now at least partially uncompressed as the carriage unit 206 has moved down relative to the housing base 102 after second tension shaft 324 is released.

As illustrated in FIG. 9A, the first jaw 218 and the second jaw 220 have swung outward and are in contact with the first bumper tube 416 and the second bumper tube 418. The outward motion of the first jaw 218 and the second jaw 220 has released the load attachment unit 212 such that the force exerted on the load attachment unit 212 by the external load has pulled the load attachment unit 212 out of the non-explosive tension release actuation device 100. As illustrated in FIGS. 9A and 9B, the load attachment unit 212 is no longer within the carriage assembly 204.

The first bumper tube 416 has stopped further outward swing of the first jaw 218, and the second bumper tube 418 has stopped further outward swing of the second jaw 220. By stopping the outward swing of the first jaw 218 and the second jaw 220, the first bumper tube 416 and the second bumper tube 418 also prevent further downward movement of the carriage unit 206, for example, prior to the carriage unit 206 contacting a bottom surface 902 of the housing base 102.

Although FIGS. 9A and 9B illustrate use of only the initiator spool assembly 326 to initiate release of the load attachment unit 212 (and thus, of the external load), in alternative embodiments, the first initiator spool assembly 302, or both of the initiator spool assembly 302, 326 may be used to initiate the sequence of events that result in the release of the load attachment unit 212 as well as the external load attached to it.

Because metal-to-metal contact is minimized/prevented when the external load is released, shock to the non-explosive tension release actuation device 100 is significant reduced compared to systems that use explosive energy sources. Further, the non-explosive tension release actuation device 100 illustrated in FIGS. 9A and 9B may be reused by replacing/refurbishing the initiator spool assembly 316 and replacing the released load attachment unit 212. Further, because explosives are not used to actuate the release of the external load, damage to the external load and to the non-explosive tension release actuation device 100 is minimized as compared to pyrotechnic actuator devices.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A non-explosive tension release actuation device, comprising:
   an initiator system;
   a housing base attached to the initiator system;
   a carriage assembly positioned at least partially within the housing base, the carriage assembly comprising a carriage unit, a first jaw, a second jaw, a first rocker arm, and a second rocker arm, wherein the carriage unit is movable relative to the housing base, wherein the first jaw is positioned on a first side of the carriage unit, wherein the second jaw is positioned on a second side of the carriage unit, and wherein the first rocker arm and the second rocker arm are attached to the carriage unit and to the initiator system; and
   a load attachment unit positioned at least partially within the carriage unit, wherein the load attachment unit rests on and between the first jaw and on the second jaw, wherein the first jaw and the second jaw are configured to swing away from the load attachment unit in response to a downward motion of the carriage unit relative to the housing base, wherein the initiator system is configured to initiate the downward motion of the carriage unit to release the load attachment unit from the carriage assembly.

2. The non-explosive tension release actuation device of claim 1, wherein the initiator system comprises a first initiator unit and a second initiator unit and wherein the downward motion of the carriage unit is initiated by one or both of the first initiator unit and the second initiator unit.

3. The non-explosive tension release actuation device of claim 2, wherein the first rocker arm is attached to the first initiator unit and wherein the second rocker arm is attached to the second initiator unit.

4. The non-explosive tension release actuation device of claim 1, further comprising a first hinge arm and a second hinge arm, wherein the first hinge arm is attached to the first jaw at a first pivot point and to the carriage unit at a second pivot point, wherein the second hinge arm is attached to the second jaw at a third pivot point and to the carriage unit at a fourth pivot point, wherein the first pivot point and the second pivot point are configured to move outwardly away from a center of the housing base in response to the downward motion of the carriage unit.

5. The non-explosive tension release actuation device of claim 4, wherein the first hinge arm is angled down from the first pivot point to the second pivot point relative to a horizontal line extending through the first pivot point and wherein the second hinge arm is angled down from the third pivot point to the fourth pivot point relative to the horizontal line.

6. The non-explosive tension release actuation device of claim 1, further comprising:
   a first bumper tube attached to the carriage unit between the first jaw and a first side of the housing base;
   a second bumper tube attached to the carriage unit between the second jaw and a second side of the housing base opposite the first side of the housing base, wherein the first bumper tube and the second bumper tube stop the downward motion of the carriage unit when the first jaw presses against the first bumper tube and the second jaw presses against the second bumper tube.

7. The non-explosive tension release actuation device of claim 1, further comprising a spring positioned between the initiator system and the carriage assembly, wherein the spring reduces unwanted movement of the carriage assembly.

8. The non-explosive tension release actuation device of claim 7, further comprising a spring guide, wherein the spring is inserted onto a protrusion of the spring guide and wherein walls of the spring guide are positioned around respective walls of the carriage unit.

9. The non-explosive tension release actuation device of claim 1, wherein the load attachment unit includes a first wall and a second wall, wherein the first wall and the second wall prevent a complete rotation of the load attachment unit within the carriage unit.

10. The non-explosive tension release actuation device of claim 9, wherein the load attachment unit further includes an attachment segment having a threaded inner surface for attachment of an external load to the load attachment unit.

11. The non-explosive tension release actuation device of claim 1, further comprising a first load plate and a second load plate, wherein the first jaw is attached to the first load plate and to the second load plate at a first attachment point, wherein the second jaw is attached to the first load plate and to the second load plate at a second attachment point, and wherein the first load plate and the second load plate rest on respective ledges in the housing base.

12. The non-explosive tension release actuation device of claim 1, wherein the first jaw is configured to swing away from the load attachment unit about the first attachment point and wherein the second jaw is configured to swing away from the load attachment unit about the second attachment point.

13. The non-explosive tension release actuation device of claim 1, wherein the initiator system is configured to initiate the downward motion of the carriage unit to release the load attachment unit from the carriage assembly in response to an electrical charge applied to the initiator system.

14. A non-explosive tension release actuation device, comprising:

an initiator system comprising a housing cover, a first initiator unit and a second initiator unit, wherein each of the first initiator unit and the second initiator unit comprises:

an initiator spool assembly;

a plunger positioned below the initiator spool assembly, the plunger having a base portion and a protruding portion, wherein the protruding portion extends from the base portion into the initiator spool assembly and wherein the base portion includes a slanted inner wall on a bottom side of the plunger;

a tension shaft positioned below the plunger and extending through an opening in the housing cover, wherein the tension shaft includes a groove extending around the tension shaft; and ball bearings in contact with the slanted inner wall of the plunger and positioned on a bottom surface of the housing cover and partially in the groove of the tension shaft, wherein the plunger retains the ball bearings in the groove of the tension shaft to prevent the tension shaft from moving downward until the plunger moves upward;

a carriage assembly comprising a first rocker arm, and a second rocker arm, wherein the first rocker arm is attached to the tension shaft of the first initiator unit, and wherein the second rocker arm is attached to the tension shaft of the second initiator unit; and a load attachment unit positioned at least partially within the carriage assembly, wherein the carriage assembly is configured to release the load attachment unit in response to the first initiator unit initiating a downward motion of the tension shaft of the first initiator unit away from the plunger.

15. The non-explosive tension release actuation device of claim 14, wherein the initiator spool assembly prevents the plunger from moving upward until the initiator spool assembly is activated.

16. The non-explosive tension release actuation device of claim 15, wherein the ball bearings are configured move out of the groove of the tension shaft in response to the plunger moving upward and wherein the tension shaft is configured to move down in response to the ball bearings moving out of the groove.

17. The non-explosive tension release actuation device of claim 14, wherein the ball bearings apply a force having a vertical component on the slanted inner wall of the plunger.

18. The non-explosive tension release actuation device of claim 14, wherein the plunger is positioned within the housing cover, wherein the housing cover is configured to prevent the plunger from moving sideways.

19. The non-explosive tension release actuation device of claim 14, wherein the tension shaft of the first initiator unit extends through the opening in the housing cover toward the first rocker arm and wherein the tension shaft of the second initiator unit extends through a second opening in the housing cover toward the second rocker arm.

20. The non-explosive tension release actuation device of claim 14, further comprising a housing base attached to a housing cover of the initiator system, wherein the carriage assembly is positioned at least partially within the housing base.

* * * * *